June 5, 1923.
W. METZGER
MEANS FOR DISTRIBUTING LUBRICATING GREASE
Filed Feb. 23, 1922
1,457,380
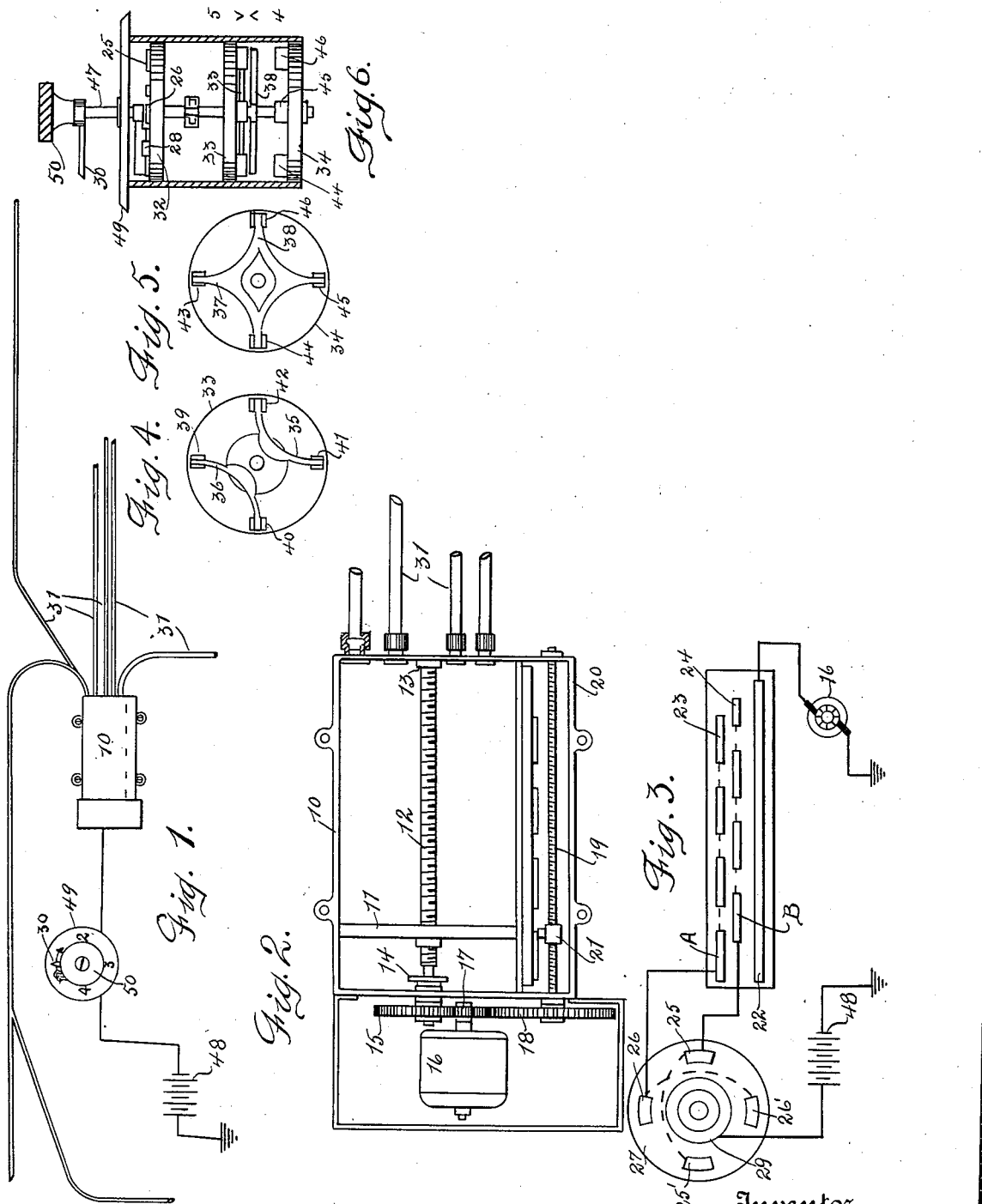
Inventor
William Metzger
By his Attorney Patented June 5, 1923.

1,457,380

UNITED STATES PATENT OFFICE.

WILLIAM METZGER, OF NEW YORK, N. Y.

MEANS FOR DISTRIBUTING LUBRICATING GREASE.

Application filed February 23, 1922. Serial No. 538,511.

*To all whom it may concern:*

Be it known that I, WILLIAM METZGER, a subject of the King of Hungary, and resident of the borough of Manhattan, city, county, and State of New York, have invented new and useful Improvements in Means for Distributing Lubricating Grease, of which the following is the specification.

The device the subject of this invention is a means for distributing lubricating grease to the several parts of a mechanism such as an automobile.

In the past, grease cups have been arranged at different points, where grease lubrication was desired and the operator or mechanician has been depended upon to screw down the grease cups from time to time and to occasionally refill them.

This inventor has discovered by observation that it very often occurs that the grease cups are not refilled, are in fact not screwed down as often as required and grease cups have been discovered where the decorative paint often applied has not been broken, showing the grease cup has not been used. This lack of lubrication causes undue friction and wear and annoying squeaks and noises.

This inventor believes that if means are provided for making the application of grease easier and lessening the work and time consumed for refilling the greasing means, there will be less incentive for neglecting this most essential work.

This applicant provided a single grease container which may be arranged at any readily accessible point, the grease being conducted through conduits to the point of use. This container may be automatic in its operation, but applicant prefers the periods of operation be under constant control.

With these objects and ideas in mind, the following is what I consider the best means for carrying out this invention and the accompanying drawing should be referred to for a complete understanding of the specification which follows.

In the drawing:—

Fig. 1 shows in diagram, the container and conduits leading away therefrom.

Fig. 2 is an enlarged view of the container.

Fig. 3 is a side elevation of the contact maker and parts associated therewith.

Fig. 4 is a reverse plan view of a part of the switch mechanism.

Fig. 5 is a plan view of another part of the switch mechanism.

Fig. 6 is a sectional view of the switch mechanism.

Similar reference numerals indicate like parts in all the figures where they appear.

The grease container or magazine, which is an essential part of my device is shown at 10 in Fig. 2 and in this figure the top is moved to disclose the interior of the device.

The magazine 10 may be an oblong box formed of sheet steel or of any other suitable material and within the box is a plunger 11 adapted to be moved therein by a screw threaded shaft 12. One end of the shaft is received in the socket member 13 and the other end of the shaft passing through the stuffing box 14 supports a cut gear 15, which gear is secured to and rotatable with the shaft 12.

A suitable motor 16, which may be an electric motor operated from the battery of the car rotates a pinion 17 in mesh with the gear 15 and the plunger or piston 11 is moved in the casing in a direction determined by the direction of rotation of the motor 16.

In mesh with the gear 15 is a second gear 18 driving a second screw threaded shaft 19, This shaft is arranged within the extension 20 of the casing and upon the shaft 19 is a contactor 21 arranged to operate along the contact bar as shown in Fig. 3.

The contact bar 22 is continuous and may be connected to one side of the motor 16 as shown.

The contact bars 23 and 24 are alternately broken and should be connected to contact points 25 and 26 of the switch member 27. This switch member may have four contact points oppositely connected in pairs as indicated by the dotted lines extending between them and the bars and contact blocks connected together are indicated by similar reference characters, the second block having a prime mark as its specific indicating means, that is the blocks 25 and 25' are connected together and the blocks 26 and 26' are connected together.

The operation of the contacting member and associated parts is as follows:—When the switch arm 28 is arranged across the continuous contact strip 29 and the block 26, the motor will rotate during such time as the contactor 21 is travelling over the section A of the contact bar 23 and upon reaching the end of this section the motor will stop. Now if the switch pointer 30 is advanced so that the arm 28 contacts with the block 25, the motor will operate while the contactor 21 travels over section B of the bar 24, in this way the movement of the piston or plunger 11 consists of a series of steps or impulses and at each impulse will eject a certain quantity of grease through the conduits 31, the several impulses or partial operations may be spaced in periods apart, in fact take place at intervals of a week or longer.

When all of the grease has been ejected from the container 10, the motor should be reversed, the piston or plunger 11 drawn back and a fresh supply of grease placed within the container 10. The reversal of the motor is accomplished by means of the switch mechanism, shown in Fig. 6 where the plate 32 carries the contact member 25 and 26 previously described, the plate 33 carries the contact members shown in Fig. 4 and the plate 34 the contact members shown in Fig. 5.

The arms indicated at 35, 36, 37 and 38 connected together in pairs are not intended to be rotatable, but merely move inward or outward to contact with the blocks 39, 40, 41 and 42 in the one instance and 43, 44, 45 and 46 in the other instance.

When the cross arms 37 and 38 are connected with their respective blocks, the motor operates ahead, but when the switch rod 46 is drawn out to the position shown and the cross arms are in contact with their blocks, the motor will operate in the reverse direction in the manner well understood in the cross connecting or reversing means of an ordinary series wound motor.

In the drawing the battery shown at 48 in Fig. 3, the switch 27 and motor 16 are shown in diagram. In Fig. 1 the face plate 49, the operating button 50 and the indicating pointer 30 of the switch mechanism are shown.

Other modifications may be made within the scope of the appended claims without departing from the principle or sacrificing the advantages of the invention.

Having carefully and fully described my invention the following is what I claim and desire to obtain:—

1. Means for distributing lubricating grease comprising a container, a piston operable therein, a motor mounted upon said container for operating said piston and a movable contact member upon said container for controlling the operation of said motor, the said contact member being operated by the piston operating means.

2. Means for distributing lubricating grease comprising a container, a piston adapted to be reciprocated therein, a motor for operating said piston and means for obtaining a step by step operation of said motor and piston to control the quantity of grease ejected.

3. Means for distributing grease, comprising a container, a plurality of conduits connected therewith, a grease moving means within said container, a motor for operating said moving means and means for controlling said motor said means comprising a plurality of sectional contact members and a contactor operating over said sectional members and a reversing means all combined as herein set forth.

Signed at the city, county and State of New York, this 25 day of January, 1922.

WILLIAM METZGER.